United States Patent Office 2,887,515
Patented May 19, 1959

2,887,515

PREPARATION OF TERTIARY BUTYL-4-METHOXYPHENOL

De Walt S. Young and George F. Rodgers, Kingsport, Tenn., assignors to Eastman Kodak Company, Rochester, N.Y., a corporation of New Jersey No Drawing. Original application March 19, 1952, Serial No. 277,548, now Patent No. 2,722,556, dated November 1, 1955. Divided and this application June 10, 1955, Serial No. 514,774

1 Claim. (Cl. 260—613)

This invention relates to a process for preparing a mixture of a major proportion of 2-tertiary butyl-4-methoxyphenol and a minor proportion of 3-tertiary butyl-4-methoxy phenol which comprises reacting mono-tertiary butyl hydroquinone with dimethyl sulfate methyl chloride, or methyl acid sulfate in an alkaline aqueous solution containing zinc dust at an elevated temperature. The compounds produced are valuable antioxidants for various materials.

Our parent application Serial No. 277,548 filed March 19, 1952, now U.S. Patent No. 2,722,556 issued on November 1, 1955 of which the present application is a division, contains the identical disclosure set forth herein for the preparation of mixed tertiary butyl-4-methoxyphenols and also describes the preparation of the mono-tertiary butyl hydroquinone required by the process described herein. The use of this mono-alkyl substituted starting material results in the unexpected and surprisingly superior yields of 2-tertiary butyl-4-methoxyphenol and correspondingly low yields of the 3-isomer.

One procedure now being used for the preparation of the two isomers of tertiary butyl-4-methoxyphenol involves the reaction of hydroquinone with a methylating agent to obtain 4-methoxyphenol, followed by alkylation of the latter with a source of the tertiary butyl radical, such as isobutylene or tertiary butyl alcohol. This prior art process has been known for a long time and has been used to a considerable extent. However, the preparation of the two isomers of tertiary butyl-4-methoxyphenol as in this known process is subject to certain inherent disadvantages which can be avoided through operation according to this invention. For instance, it is not possible to completely convert hydroquinone to the corresponding 4-methoxyphenol by means of any known practical process. Part of the starting hydroquinone is unavoidably converted into 1,4-dimethoxybenzene, which cannot be advantageously employed in the preparation of isomers of tertiary butyl-4-methoxyphenol and this represents a loss. In addition, the butylation of 4-methoxyphenol presents further difficulties in that the product is contaminated with dibutylated derivatives of 4-methoxyphenol as well as unreacted starting materials; hence, the isolation of the desired product requires a careful separation from these impurities. Although any unreacted 4-methoxyphenol may be recovered and recycled, the dialkylated derivative is of little value and has to be subjected to an entirely different and additional reaction if any useful product of the food antioxidant category is to be obtained.

A further disadvantage which results through the use of this prior art type of procedure is to be found in the unfavorable ratio of the two possible isomers of the mono-butylated-4-methoxy phenol, viz. 2-tertiary butyl-4-methoxyphenol and 3-tertiary butyl-4-methoxyphenol. A study of the relative potency of these two isomers as anti-oxidants in fats, vegetable oils, etc. has shown that 2-tertiary butyl-4-methoxyphenol is of considerably more value than the other isomer. In the preparation of isomers of butylated-4-methoxyphenol according to the methods of the type disclosed by the prior art as discussed above, the less potent isomer, viz. 3-tertiary butyl-4-methoxyphenol, predominates in the final product.

We have now found that the desired preparation of a product which contains an unusually high proportion of the desired 2-tertiary butyl-4-methoxyphenol can be achieved with greater economy and over-all efficiency by a process involving an inverted method to that of the type referred to above as disclosed by the prior art. According to our discovery, hydroquinone is first treated with a butylating agent in accordance with an especially effective process to form the mono-tertiary butyl derivative which is then converted according to another aspect of our invention to a product comprising an unusually high percentage of the desired 2-tertiary butyl-4-methoxyphenol.

It is an object of our invention as claimed herein to provide an especially effective process for preparing a mixture of the two isomers of tertiary butyl-4-methoxyphenol whereby the isomer having the greatest potency as a food antioxidant is prepared in unexpectedly larger proportions than could be done by the prior art processes such as discussed hereinabove. Other objects will become apparent hereinafter.

MONO-TERTIARY BUTYL-4-METHOXYPHENOL

The herein described and claimed aspect of our invention provides a process for preparing a mixture of a major proportion of 2-tertiary butyl-4-methoxyphenol and a minor proportion of 3-tertiary butyl-4-methoxyphenol which comprises reacting at an elevated temperature mono-tertiary butylhydroquinone with a compound selected from the group consisting of methyl chloride, dimethyl sulfate and methyl acid sulfate in an aqueous alkaline solution containing at least about 0.1% of comminuted zinc under an atmosphere containing insufficient oxygen to substantially oxidize the phenolic hydroxyl radicals under these conditions. Dimethyl sulfate is most advantageously employed.

According to the prior art procedure which involves the reaction of hydroquinone with a methylating agent to obtain 4-methoxy phenol followed by alkylation of this compound with a tertiary butyl radical such as isobutylene or tertiary butyl alcohol, the principal isomer obtained is the 3-tertiary butyl-4-methoxy phenol. Except for minor modifications of technique, the prior art reaction has been known and used for a long time and is well described in the literature. This prior art procedure is subject to certain inherent disadvantages which may be avoided through operation in accordance with our invention. In the first place, as has been pointed out above, it is not possible to convert hydroquinone completely to the corresponding monomethyl ether, viz. 4-methoxy phenol, by means of any heretofore known practical process. As further pointed out above, part of the starting hydroquinone is unavoidably converted into hydroquinone dimethyl ether, viz. 1,4-dimethoxy benzene, which cannot be applied in the manufacture of derivatives of mono-tertiary butyl-4-methoxyphenol without adding an additional step. In addition, the butylation of hydroquinone monomethyl ether, viz. 4-methoxy phenol, presents further difficulties in that the product is contaminated with dibutylated derivatives of 4-methoxy phenol as well as unreacted starting material. Thus, isolation of isomers of mono-tertiary butyl-4-methoxyphenol requires a careful separation from these impurities. Although any unreacted 4-methoxy phenol may be recovered and recycled, the dibutylated derivative is of little or no value as a food antioxidant.

A further disadvantage which results through the use of the prior art procedure is to be found in the unfavorable ratio of the two possible isomers of mono-tertiary butyl-4-methoxy phenol as mentioned above, i.e. the 3- tertiary butyl-4-methoxyphenol predominates in the prior art procedure, whereas the 2-tertiary butyl-4-methoxyphenol is the most effective food antioxidant.

According to the present aspect of the invention, the preparation of a higher yield of the desired 2-tertiary butyl-4-methoxyphenol can be achieved with greater economy and overall efficiency by a system of operations which is in inverted order to that employed in accordance with the prior art procedure discussed. Thus, our procedure provides for the monobutylation of the hydroquinone followed by the subsequent conversion to the desired monomethyl ether. Since mono-tertiary butyl-hydroquinone has not heretofore been available by a practical process until that described in our copending parent application referred to above, our invention in its overall considerations represents a marked improvement over the prior art.

According to this present aspect of our invention, the formation of useless by-products is held to a remarkably low value. By using a dialkyl sulfate such as dimethyl sulfate to obtain a crude product consisting almost entirely of the monomethyl ether of tertiary butyl hydroquinone (viz. mono-tertiary butyl-4-methoxyphenol) there is little or no simultaneous conversion to the dimethyl ether of tertiary butyl hydroquinone which has no particular value as a food antioxidant. In accordance with our process, any unreacted monotertiary butyl hydroquinone can be separated very easily by solution in hot water in which mono-tertiary butyl-4-methoxyphenol is insoluble. Thus the entire process beginning with hydroquinone described under the first aspect of our invention as set forth in our parent application through to the preparation of the mixed isomers of mono-tertiary butyl-4-methoxy-phenol may be conducted with negligible loss of material. In addition, it has been discovered that by operation according to the procedures described below, the more potent antioxidant, viz. 2-tertiary butyl-4-methoxyphenol, predominates in the final product.

In operating under this aspect of our invention it is advantageous to react mono-tertiary butyl hydroquinone with dimethyl sulfate in the presence of aqueous sodium hydroxide. The reactants can be advantageously stirred at reflux temperature until mono-methylation has been completed, after which the reaction mixture can be advantageously cooled to room temperature and subsequently acidified. The desired mixture of isomers of tertiary butyl-4-methoxyphenol can then be advantageously extracted from the aqueous acidified reaction mixture by means of a suitable solvent which can advantageously be benzene. The extract can then be advantageously purified by distillation at reduced pressure. Alternatively, the purification by distillation can be advantageously simplified by extraction of the unreacted mono-tertiary butyl hydroquinone from the crude mixture by means of hot water in which the desired mixture of isomers of mono-tertiary butyl-4-methoxyphenol is insoluble.

It is evident that other alkali metal hydroxides besides sodium hydroxide can be employed, e.g. potassium hydroxide, etc. The acidification can be accomplished advantageously by employing concentrated hydrochloric acid; however, other strong acids can also be employed, e.g. hydrobromic acid, sulfuric acid, etc.

The quantity of dimethyl sulfate should be somewhat greater than the stoichiometrical amount for the desired monoetherification, based on the utilization of both methyl groups of the dimethyl sulfate. The dimethyl sulfate used need not be more than double the stoichiometrical quantity. The sodium hydroxide or other alkaline-acting reagent should be sufficient to avoid the formation of free acid during the etherification. The period of time required for conducting the reaction can be varied considerably; ordinarily no more than 18 hours is necessary and a much shorter period of time can be employed. In addition to the employment of dimethyl sulfate as the etherification reagent, other similar dialkyl sulfates can be employed as well as other compounds well known in the art to be useful as etherification reagents, e.g. methyl acid sulfate methyl chloride, diethyl sulfate, etc. However, since the product desired is the monomethyl ether, the disclosure will be directed toward the preparation of this compound employing methyl chloride, dimethyl sulfate or methyl acid sulfate. It is obvious that twice as many mole proportions of methyl chloride or methyl acid sulfate are necessary to provide the equivalent quantity of methyl radicals as are provided by dimethyl sulfate. In addition to employing mono-tertiary butyl hydroquinone, other similar analogous derivatives of hydroquinone can be employed according to this process; however, since the isomers of the monomethyl ether of tertiary butyl hydroquinone are the most advantageous food antioxidants, this disclosure will be directed primarily toward such compounds.

Contact of the alkaline solution of mono-tertiary butyl hydroquinone with atmospheric oxygen has deleterious results, i.e. it apparently undergoes rapid oxidation to form the corresponding quinone and subsequently forms highly colored quinone condensation products. We have found that the addition of at least about 0.1% of comminuted zinc, and advantageously from about one-quarter to about one-half percent of zinc dust (based on the weight of the mono-tertiary hydroquinone employed), in combination with the use of an inert atmosphere, e.g. nitrogen, almost completely eliminates these deleterious colored impurities in the crude product. If there is a trace of residual color in the crude product, removal may be made by complete distillation in the presence of 0.1 percent zinc dust. It is evident that other metallic dusts equivalent to zinc dust could be similarly employed.

The length of time for the addition and the avoidance of an excess of dimethyl sulfate do not appear to be especially critical in the operation of the process described. The presence of some excess dimethyl sulfate does not result in substantial etherification of the hydroxy radical ortho to the tertiary butyl radical. In an experiment, 66.5 percent excess of dimethyl sulfate was added in 40 minutes at reflux and the reflux temperature was maintained for five hours. The yield of the mixed isomers of tertiary butyl-4-methoxyphenol was 77½ percent and the yield of the diether by-product, viz. mono-tertiary butyl-1,4-dimethoxy phenol was 13 percent.

The following example will serve to further illustrate this aspect of the invention:

*Example No. 1*

332 grams of mono-tertiary butyl hydroquinone and 1 gram of zinc dust were slurried with water in an inert nitrogen atmosphere, and the temperature of the mixture was increased to reflux. Next, 85 grams of sodium hydroxide was added. 140 grams of dimethyl sulfate was introduced over a 45-minute period and the reactants were maintained under reflux conditions for 18 hours. On cooling, 25 cc. of concentrated hydrochloric acid was added to acidify the reaction mixture, and the crude product was extracted with benzene. After washing the benzene extract with warm water, the solvent was removed and crude tertiary butyl-4-methoxyphenol was isolated as a viscous liquid or low melting solid weighing 348 grams. On purification by fractional distillation, only four grams of tertiary butyl-1,4-dimethoxy benzene (the dimethyl ether) was isolated as a low boiling fraction. The distillation then yielded 271 grams of the mixed isomers of the desired product, viz. mono-tertiary butyl-4-methoxyphenol, leaving a residue of 73 grams of a mixture of this desired product together with unreacted mono-tertiary butyl hydroquinone. This residue was recycled in a succeeding run of the process just described. A representative portion of the 271 grams of mixed isomers of mono-tertiary butyl-4-methoxyphenol showed the following composition:

79.4% of 2-tertiary butyl-4-methoxyphenol
17.6% of 3-tertiary butyl-4-methoxyphenol In order to show the improvement achieved by our invention over the prior art, 4-methoxy phenol was alkylated with tertiary butyl alcohol in accordance with the above described prior art procedure and the product obtained was analyzed and found to have the following composition:

2.0% of 4-methoxyphenol
40.5% of 2-tertiary butyl-4-methoxyphenol
52.1% of 3-tertiary butyl-4-methoxyphenol
5.4% of 2,5-ditertiary butyl-4-methoxyphenol The above ratio of the 2-isomer to the 3-isomer is 0.78 which can be compared with the ratio obtained in the employment of the process described in Example 1 wherein 79.4% of the 2-isomer and 17.6% of the 3-isomer are obtained, thereby giving a ratio of 4.5. This marked improvement over the prior art is indeed quite pronounced. It is apparent that, through the use of the process of our invention, the ratio of the most desirable isomer is increased from 0.78 to 4.5. At the same time, the total concentration of the combination of both isomers is increased from 92.6% to 97% because of the more facile separation of product from impurities.

In Example 1, 332 grams of mono-tertiary butyl hydroquinone yielded 271 grams of butylated-4-methoxy phenol isomers, four grams of mono-tertiary butyl 1,4-dimethoxy phenol benzene and 73 grams of a mixture of starting material with some residual butylated-4-methoxy phenol. No analysis was made of the 73-gram residue inasmuch as it was suitable for re-employment in a subsequent run. If the 73-gram residue was entirely a mixture of the isomers of mono-tertiary butyl-4-methoxy-phenol, then the overall yield would be over 95 percent. If the 73-gram residue was entirely the starting material, then the overall yield based on the quantity of starting material consumed would be over 96 percent. In either instance, it is evident that the process of this aspect of our invention produces very high yields of the mixed isomers of mono-tertiary butyl-4-methoxyphenol.

In addition to the preferred advantageous employment of dimethyl sulfate as described in Example 1, good results can also be advantageously obtained employing methyl chloride or methyl acid sulfate. Thus, the 140 grams of dimethyl sulfate in Example 1 can be replaced with about 115 grams of methyl chloride or about 250 grams of methyl acid sulfate. When employing methyl chloride, a pressure vessel, e.g. an autoclave, is necessary because of the gaseous nature of this reactant.

We claim:

The process which comprises reacting 2-tertiary butylhydroquinone with more than 0.5 and less than 0.8 mol of etherification agent per mol of 2-tertiary butylhydroquinone, said reaction being carried out in the presence of aqueous caustic and comminuted zinc at a temperature of from room temperature to about the reflux temperature of the reaction mixture, said etherification agent being dimethyl sulfate, to form a major proportion of 2-tertiary butyl-4-methoxyphenol and a minor proportion of 3-tertiary butyl-4-methoxyphenol.

References Cited in the file of this patent

UNITED STATES PATENTS

| | | |
|---|---|---|
| 1,281,662 | Zollinger et al. | Oct. 15, 1918 |
| 1,730,061 | Davidson | Oct. 1, 1929 |
| 2,632,025 | Greb | Mar. 17, 1953 |
| 2,776,321 | Clemens | Jan. 1, 1957 |
| 2,781,404 | Rosenwald | Feb. 12, 1957 |
| 2,801,268 | Brimer | July 30, 1957 |